United States Patent
Koller et al.

(10) Patent No.: US 6,917,632 B2
(45) Date of Patent: Jul. 12, 2005

(54) INTERRUPT DRIVEN WAVELENGTH LOCKING

(75) Inventors: Kenneth P. Koller, Moss Beach, CA (US); Rajesh K. Batra, East Palo Alto, CA (US); Robert A. Carney, Belmont, CA (US); Douglas A. Sprock, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 10/335,776

(22) Filed: Dec. 31, 2002

(65) Prior Publication Data

US 2004/0125830 A1 Jul. 1, 2004

(51) Int. Cl.[7] .............................. H01S 3/10; H01S 3/13; H01S 3/00
(52) U.S. Cl. ............................. 372/20; 372/9; 372/26; 372/29.011; 372/38.01
(58) Field of Search ........................... 372/8, 9, 20, 26, 372/29.011, 29.02, 29.022, 32, 38.1, 38.01, 38.02, 92, 109, 23

(56) References Cited

U.S. PATENT DOCUMENTS

| | | | |
|---|---|---|---|
| 5,200,715 A | * | 4/1993 | Gerdes et al. ............... 332/185 |
| 6,272,157 B1 | * | 8/2001 | Broutin et al. ................ 372/32 |
| 6,366,592 B1 | * | 4/2002 | Flanders ....................... 372/18 |
| 6,501,773 B1 | * | 12/2002 | Volz et al. ................ 372/29.02 |
| 6,516,010 B1 | * | 2/2003 | Broutin et al. ........... 372/29.01 |
| 6,697,397 B2 | * | 2/2004 | Theodoras ............... 372/29.02 |
| 6,717,965 B2 | * | 4/2004 | Hopkins et al. .............. 372/20 |
| 2002/0126386 A1 | | 9/2002 | Jordan et al. |
| 2002/0163650 A1 | | 11/2002 | May |

* cited by examiner

*Primary Examiner*—Minsun Oh Harvey
*Assistant Examiner*—Armando Rodriguez
(74) *Attorney, Agent, or Firm*—Blakely, Sokoloff, Taylor & Zafman LLP

(57) ABSTRACT

In one embodiment of the present invention, an apparatus operates a control loop for a tunable optical device. A digital reference signal is converted to an analog reference signal and then introduced into the optical path of the tunable optical device. An analog feedback signal, corresponding to the digital reference signal, is recovered from the tunable optical device. The analog feedback signal is converted to a digital feedback signal. The apparatus sends tuning information to the tunable optical device based on analysis of the digital reference signal and the digital feedback signal. In one embodiment, the tuning information is used for wavelength locking of the tunable optical device. In another embodiment, the operation of the control loop is synchronized with another function of the tunable optical device.

26 Claims, 5 Drawing Sheets

US 6,917,632 B2

INTERRUPT DRIVEN WAVELENGTH LOCKING

FIELD OF THE INVENTION

Embodiments of the present invention relate generally to tunable optical devices and, more specifically but not exclusively relate to digital control of wavelength locking for tunable lasers.

BACKGROUND INFORMATION

Tunable optical devices, such as tunable lasers, have been implemented in a variety of applications such as telecommunications, computer networking, and medical technology. Dense wavelength division multiplexing (DWDM) equipment utilizes tunable laser technology to maximize the available bandwidth of optical fiber networks. In DWDM optical systems, multiple separate data streams propagate concurrently in a single optical fiber, with each data stream created by the modulated output of a laser at a specific channel frequency or wavelength. Presently, channel separations of approximately 0.4 nanometers in wavelength, or about 50 GHz are achievable, which allows up to 128 channels to be carried by a single fiber within the bandwidth range of currently available fibers and fiber amplifiers. Greater bandwidth requirements will likely result in smaller channel separation in the future.

When tuning a tunable laser to a specific wavelength, various methods are used to keep the device on the selected wavelength. Wavelength locking designs are commonly implemented with hardware structures utilizing analog circuitry. However, because of their physical size, such analog hardware wavelength locking designs have limited miniaturization capability. Analog hardware structures are also susceptible to error caused by environmental temperature changes, aging of the hardware equipment, and sensitivity to noise. In addition, analog hardware wavelength locking schemes are not easily synchronized with other control functions of a tunable laser. Lastly, analog hardware wavelength locking schemes are difficult to update in light of changes to laser hardware designs.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION

Embodiments of method and apparatus for tuning a tunable optical device using digital techniques are described herein. In the following description, numerous specific details are set forth to provide a thorough understanding of embodiments of the invention. One of ordinary skill in the relevant art will recognize, however, that embodiments of the invention can be practiced without one or more of the specific details, or with other methods, components, materials, etc. In other instances, well-known structures, materials, or operations are not shown or described in detail to avoid obscuring the description.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the following description, for purposes of explanation, specific nomenclature may be set forth to provide a thorough understanding of embodiments of the present invention. However, it will be apparent to one skilled in the art after reading the description that these specific details are not required to practice embodiments of the present invention.

Figure 1:
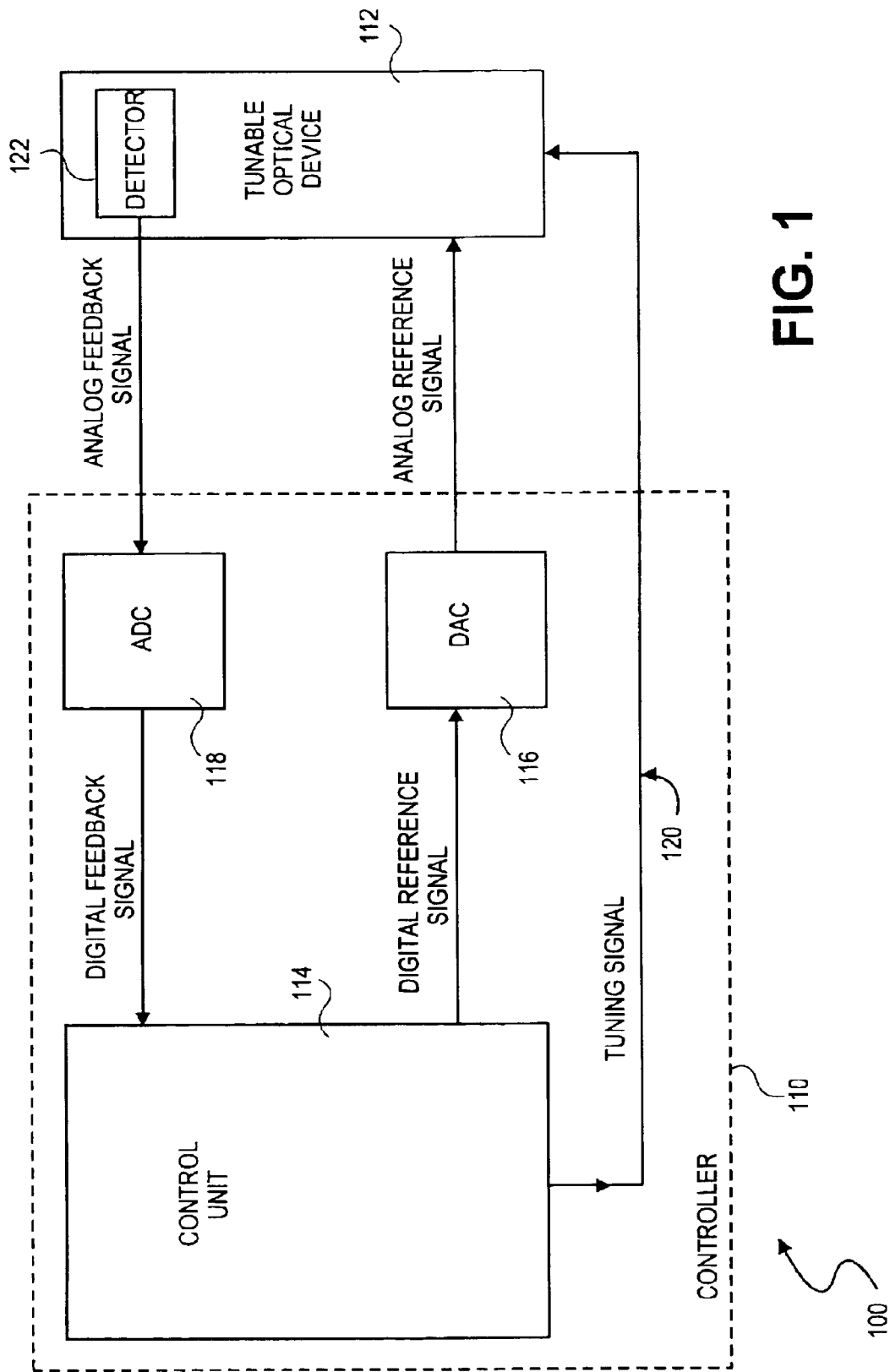
FIG. 1 is a block diagram illustrating a controller in conjunction with a tunable optical device, in accordance with one embodiment of the present invention.

FIG. 1 illustrates an apparatus 100 according to one embodiment of the present invention. Apparatus 100 includes a controller 110 connected to a tunable optical device 112. FIG. 1 is a top-level view of one embodiment of the present invention and more detailed exemplary illustrations will follow. In this embodiment, controller 110 includes a control unit 114, a digital-to-analog converter (DAC) 116, and an analog-to-digital converter (ADC) 118. In this embodiment, tunable optical device 112 includes a detector 122. It should be noted that DAC 116 and ADC 118 are conventional components and are well known in the art.

As illustrated in the depicted embodiment, control unit 114 is coupled to the digital input port of DAC 116. The analog output port of DAC 116 is coupled to tunable optical device 112. Detector 122 is coupled to tunable optical device 112 and to the analog input port of ADC 118. In one embodiment, detector 122 is a component of tunable optical device 112. The digital output port of ADC 118 is coupled to control unit 114. Control unit 114 is also coupled to tunable optical device 112 for sending a tuning signal 120 to the tunable optical device 112.

In one embodiment, control unit 114 operates a control loop for tuning the tunable optical device 112. The control loop includes a reference signal and a feedback signal. Control unit 114 generates a digital reference signal. This digital reference signal is sent to the digital input of DAC 116. DAC 116 receives the digital reference signal and converts it to an analog reference signal. The analog reference signal is sent from DAC 116 to tunable optical device 112. Tunable optical device 112 includes, but is not limited to, a tunable external cavity laser that can be tuned to a specific wavelength or waveband. The tunable optical device 112 is responsive to the analog reference signal. In one embodiment, the analog reference signal is introduced into the optical path of the tunable optical device 112 to modulate the optical output signal of tunable optical device 112. Detector 122 detects an analog feedback signal from the tunable optical device 112 that corresponds to the analog reference signal. The detector 122 sends the analog feedback signal to the analog input of ADC 118. ADC 118 converts the analog feedback signal to a digital feedback signal. The digital feedback signal is sent from ADC 118 to control unit 114.

In one embodiment, control unit 114 analyzes the digital reference signal and the digital feedback signal to determine any tuning error of the tunable optical device 112. The control unit generates a tuning signal 120 based on the analysis of the digital reference signal and the digital feedback signal and sends the tuning signal 120 to the tunable optical device 112. Tunable optical device 112 uses the tuning signal 120 to operate one or more tuning functions to minimize the tuning error.

In one embodiment, the control unit 114 performs wavelength locking of the tunable optical device 112. The control unit 114 determines in which direction and how far the tunable optical device 112 is from a selected wavelength using the digital reference signal and the digital feedback signal. Wavelength locking is discussed below.

Figure 2:
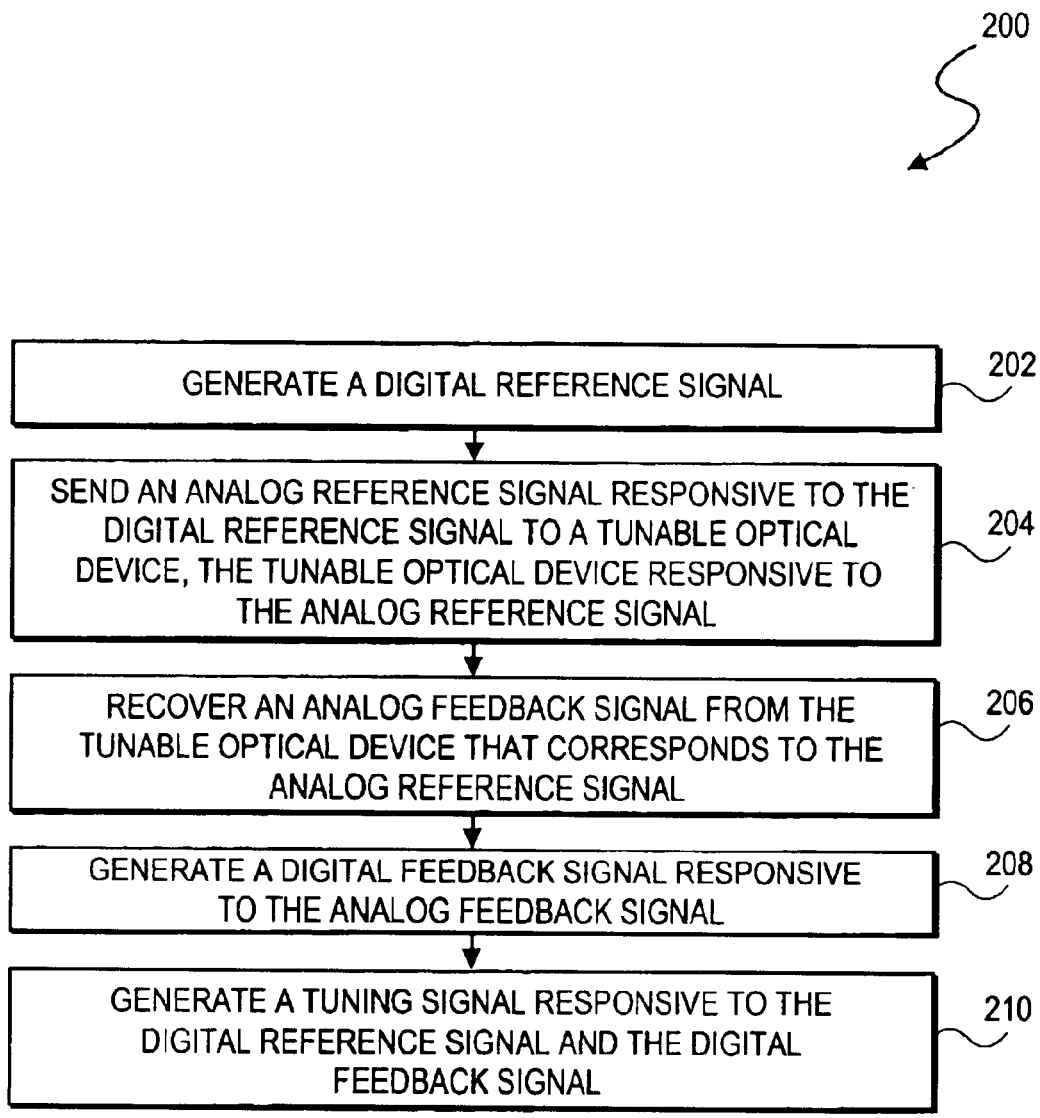
FIG. 2 is a flow diagram illustrating a control loop process for tuning a tunable optical device, according to one embodiment of the present invention.

FIG. 2 illustrates a flowchart of a control loop process 200 for tuning a tunable optical device, according to one embodiment of the present invention. In block 202, a digital reference signal is generated. For example, in one embodiment, control unit 114 generates the digital reference signal. In block 204, an analog reference signal, that is responsive to the digital reference signal of block 202, is sent to a tunable optical device. In one embodiment, the digital reference signal passes through a DAC 116 to create the analog reference signal that is sent to tunable optical device 112. Continuing in block 204, the tunable optical device is responsive to the analog reference signal. For example, in one embodiment, the analog reference signal is introduced into the optical path of the tunable optical device 112 as a dither signal to modulate an optical output signal of the tunable optical device 112.

In block 206, an analog feedback signal is recovered from the tunable optical device. The analog feedback signal corresponds to the analog reference signal that was sent to the tunable optical device in block 204. For example, in one embodiment, detector 122 recovers the analog feedback signal from tunable optical device 112. In block 208, a digital feedback signal is generated responsive to the analog feedback signal. In one embodiment, the analog feedback signal is sent through ADC 118 to convert the analog feedback signal to a digital feedback signal. In block 210, a tuning signal is generated responsive to the digital reference signal and the digital feedback signal. For example, in one embodiment, control unit 114 generates tuning signal 120 in response to the digital reference signal and the digital feedback signal. Tuning signal 120 is sent to the tunable optical device 112 to correct any tuning error.

Figure 3:
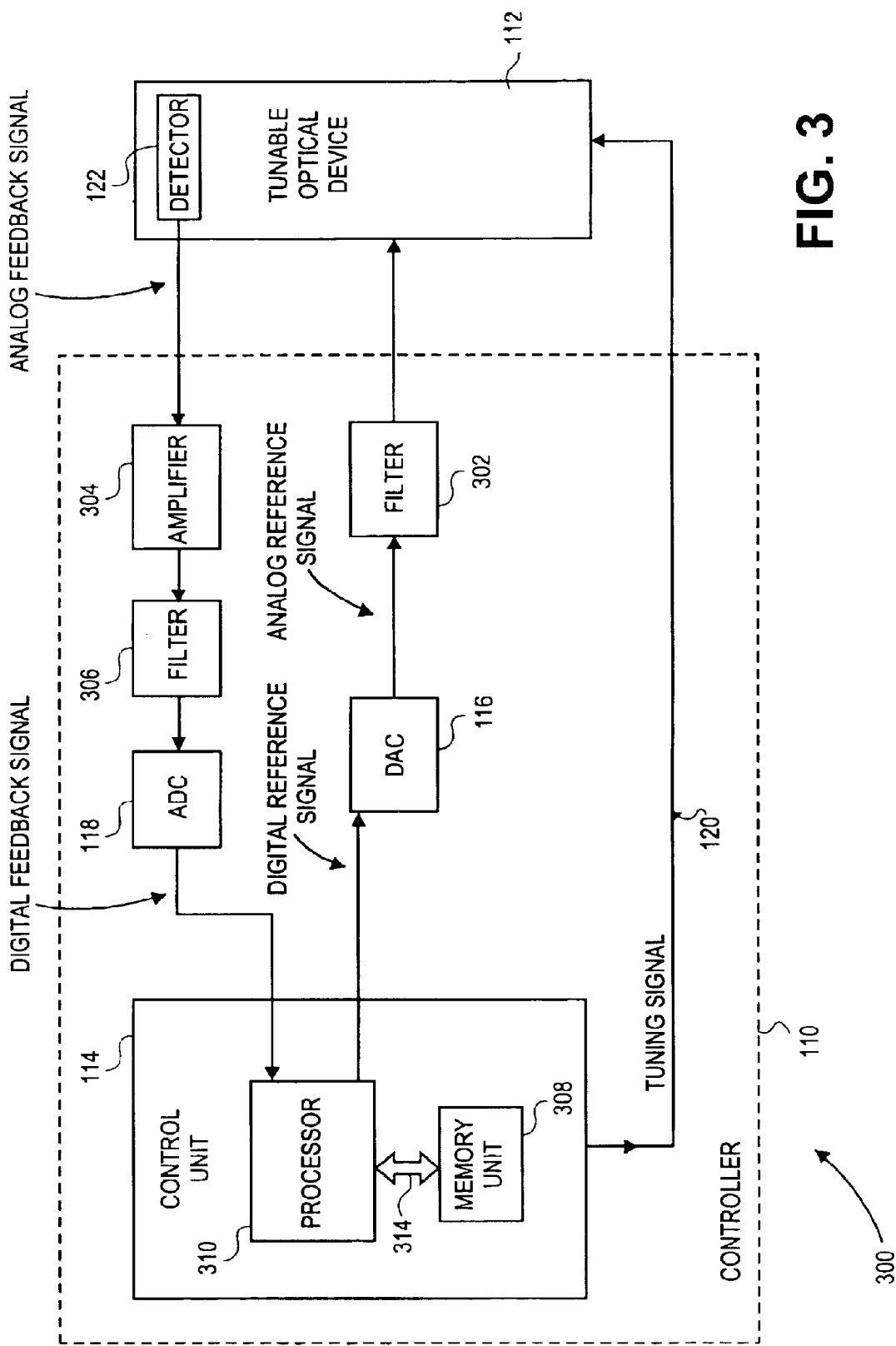
FIG. 3 is a block diagram illustrating a controller in conjunction with a tunable optical device, in accordance with one embodiment of the present invention.

FIG. 3 illustrates an apparatus 300 according to one embodiment of the present invention. In this embodiment, apparatus 300 includes a controller 110 connected to a tunable optical device 112. Controller 110 includes a DAC 116, an ADC 118, a filter 302, an amplifier 304, a filter 306, and control unit 114. Control unit 114 includes a memory unit 308 and a processor 310. In one embodiment, the memory unit 308 and the processor 310 are interconnected along a bus 314. In this embodiment, tunable optical device 112 includes a detector 122.

In one embodiment, memory unit 308 includes nonvolatile memory. Such nonvolatile memory includes, but is not limited to, programmable read-only memory (PROM), erasable programmable read-only memory (EPROM), electrically erasable programmable read-only memory (EEPROM), flash memory. Memory unit 308 can also include random access memory (RAM) that can, for example, include a battery backup. Memory unit 308 stores instructions used by processor 310. Memory unit 308 also stores data to generate a digital reference signal. In one embodiment, such data takes the form of a waveform look-up table having data words representing the amplitude of the waveform over various points of time.

Processor 310 may be a microcontroller or a general purpose microprocessor including, but not limited to, Intel family microprocessor such as the Intel 8051, a Motorola family microprocessor, or the like. Operations performed by processor 310 may be conducted in accordance with instructions stored on memory unit 308.

Processor 310 and memory unit 308 operate in cooperation with each other to perform tuning of tunable optical device 112, including wavelength locking (discussed below.) It is noted that other embodiments may be employed in place of the ones described herein that combine the functionalities of processor 310 and memory unit 308. Other embodiments may employ one or more programmable logic devices such as a Complex Programmable Logic Device (CPLD), an Application Specific Integrated Circuit (ASIC), or a Field Programmable Gate Array (FPGA).

Control unit 114 conducts various operations using interrupt signals. In one embodiment, processor 310 generates the interrupt signals; in another embodiment, an interrupt controller coupled to processor 310 generates the interrupt signals. For example, processor 310 generates a series of interrupt signals to request data from memory unit 308 to construct the digital reference signal. In response to each interrupt signal, processor 310 retrieves the next data word in the waveform look-up table stored in memory unit 308. In one embodiment, processor 310 is configured to generate interrupt signals at a rate to achieve a selected frequency of the digital reference signal. In another embodiment, processor 310 sends the digital reference signal to DAC 116 in response to an interrupt signal. In another embodiment, processor 310 retrieves the digital feedback signal from ADC 118 in response to an interrupt signal. In another embodiment, the sending of the digital reference signal to DAC 116 from processor 310 and processor 310 requesting the digital feedback signal from ADC 118 occurs in response to the same interrupt signal.

Processor 310 forwards the digital reference signal to DAC 116. DAC 116 converts the digital reference signal to an analog reference signal. The analog reference signal is sent from the DAC 116 to filter 302. In one embodiment, filter 302 is a low pass filter. The filtered analog reference signal is received by tunable optical device 112.

The tunable optical device 112 is responsive to the analog reference signal. In one embodiment, the analog reference signal is applied to an electro-optic material that is in the optical path of the tunable optical device 112. In this embodiment, the analog reference signal is used to modulate the optical path length of tunable optical device 112 which creates differences in wavelength. An analog feedback signal corresponding to the change in wavelength is part of the optical output from tunable optical device 112.

Detector 122 detects an analog feedback signal corresponding to the analog reference signal. In one embodiment, the tunable optical device 112 is a tunable external cavity laser such that the analog feedback signal is detected by monitoring the voltage across a gain medium or by monitoring the current level output of a photodiode that samples the laser output. One such embodiment of a tunable external cavity laser is discussed in conjunction with FIG. 4.

The analog feedback signal is sent from detector 122 to amplifier 304. In one embodiment, amplifier 304 is a single stage pre-amplifier.

The analog feedback signal is sent from amplifier 304 to filter 306. In some embodiments, filter 306 may be a bandpass filter, an anti-alias filter, or any other filter or combination of filters to eliminate noise outside of the band of interest.

The analog feedback signal is sent from filter 306 to ADC 118. ADC 118 converts the analog feedback signal to a digital feedback signal. In response to an interrupt signal, processor 310 requests the digital feedback signal from ADC 118.

The digital reference signal and the digital feedback signal are used by the control unit 114 to generate the tuning signal 120. In one embodiment, the processor 310 executes instructions stored in memory unit 308 to compute information for wavelength locking. Such information includes the direction and distance the tunable optical device 112 is from a selected wavelength. In one embodiment, wavelength locking information is determined by multiplying the digital reference signal with the digital feedback signal. After the signals are multiplied, the resulting signal is put through a digital low pass filter. Processor 310 executes instructions stored in memory unit 308 to perform the digital low pass filtering. The digital low pass filter removes the higher insignificant frequencies and leaves the signal that corresponds to the tuning error. For example, it can be shown that for a sinusoidal reference signal, the amplitude of the low-pass filtered product of the reference signal and the feedback signal depends on the tuning error. Multiplication and filtering of the digital reference signal with the digital feedback signal allows recovery of very small signals that might be buried in noise, as long as the digital feedback signal and the digital reference signal are at the same frequency.

Performing wavelength locking through digital techniques rather than analog techniques offers several advantages. Generally, digital structures use less physical space than comparative analog structures. Also, digital techniques have little susceptibility to environmental temperature changes, aging, and noise. Also, wavelength locking through digital techniques allows easy updating due to changes in the tunable optical device 112.

The tuning signal 120 is provided to tunable optical device 112 which uses the information to operate one or more tuning functions to reduce the tuning error. These tuning functions include, but are not limited to, laser temperature control, laser motor control, and the like.

By implementing the control unit 114 through digital circuitry, the operation of the control loop can be synchronized with other functions of the tunable optical device 112. One or more of these functions may be acting simultaneously with the operation of the control loop. Synchronization has several benefits, including: 1) synchronizing the reference signal with the sampling of the feedback signal to simplify the task of updating the loop and maintaining wavelength lock, 2) multiple control loops can be synchronized to maintain rigid wavelength locking and thus a high quality output signal, and 3) multiple control loops may interact and share information. Also, storing the waveform look-up table and the control loop analysis instructions in non-volatile memory provides flexibility for updating due to changes/updates of tunable optical device 112 and/or other components.

Using digital techniques for control unit 114 also permits running asynchronous operations. For example, the control loop for wavelength locking can be performed asynchronous with other operations of tunable optical device 112. Thus, noise that might obscure the analog reference signal or the analog feedback signal can be avoided. Also, other functions of tunable optical device 112 that may cause inaccuracies in the control loop, such as adjusting laser temperature, can be averted.

Figure 4:
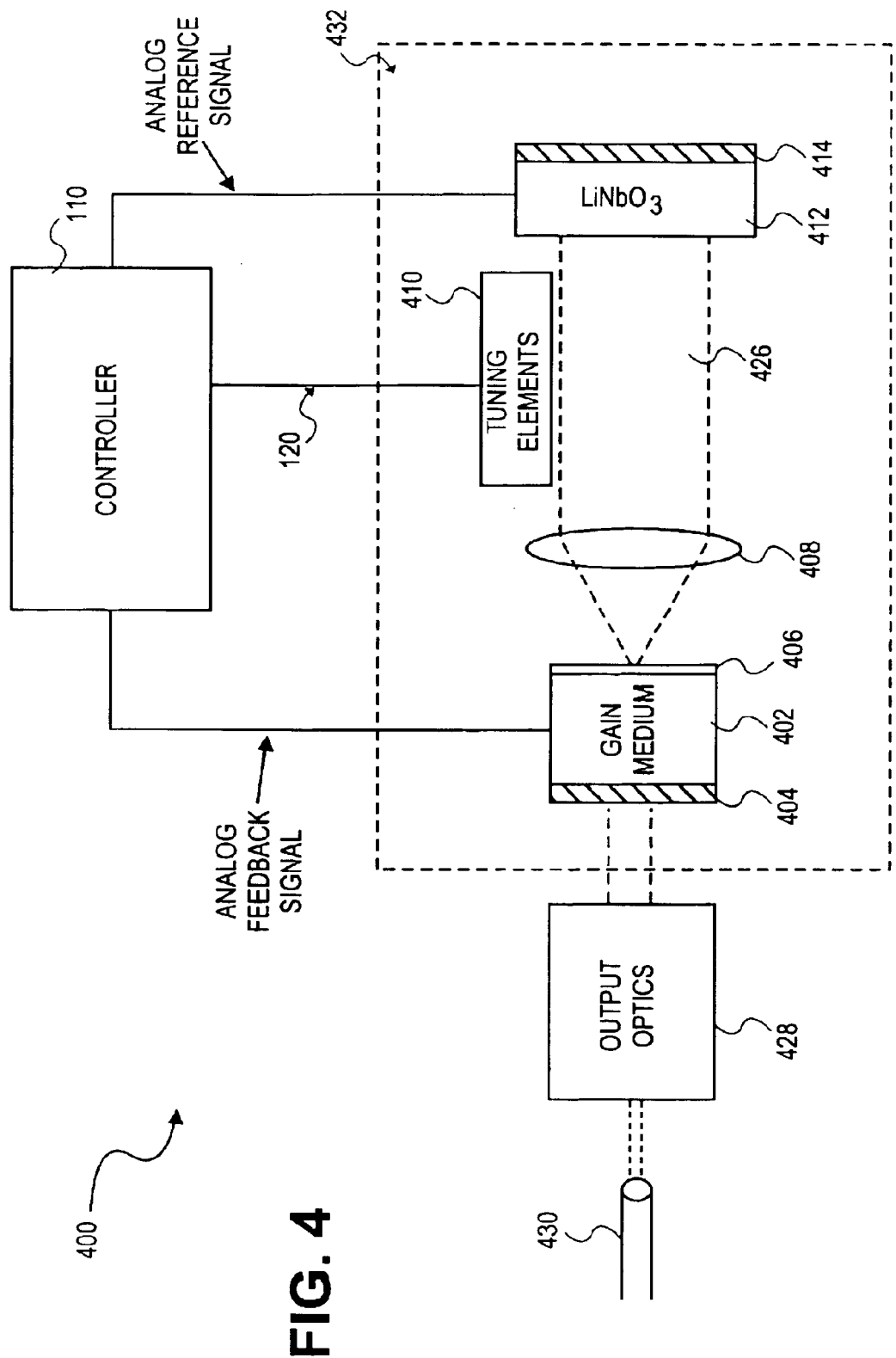
FIG. 4 is a block diagram illustrating a tunable external cavity laser in conjunction with a controller, in accordance with one embodiment of the present invention

FIG. 4 illustrates an apparatus 400 according to one embodiment of the present invention. In this embodiment, tunable external cavity laser 432 is coupled to controller 110. The tunable external cavity laser 432 includes gain medium 402, lens 408, tuning elements 410, a modulation element 412, and an end mirror 414. Gain medium 402 includes, but is not limited to, a conventional Fabry-Perot diode element chip having an anti-reflective (AR) coated rear facet 406 and a partially reflective front facet 404. Modulating element 412 includes, but is not limited to, an etalon of electro-optic material such as Lithium Niobate ($LiNbO_3$). Front facet 404 and end mirror 414 define an external cavity for the tunable external cavity laser 432.

In operation, gain medium 402 emits a coherent beam from rear facet 406 that is collimated by lens 408 to define an optical path 426 which is co-linear with the optical axis of the external cavity. Rear facet 406 and front facet 404 of gain medium 12 are aligned with the optical axis of the external cavity. Light reflected from end mirror 414 is fed back along optical path 426 into gain medium 402. Conventional output optics 428 are associated with front facet 404 for coupling the output of the tunable external cavity laser 432 to an optical fiber 430.

According to one embodiment of the present invention, controller 110 performs wavelength locking of the tunable external cavity laser 432. The controller 110 provides an analog reference signal to modulation element 412. As discussed above, controller 110 initially generates a digital reference signal and then provides an analog reference signal to the tunable external cavity laser 432. The digital/analog reference signal is a signal modulation in the form of a frequency dither.

The analog reference signal is introduced to the optical path 426 via modulation element 412. Modulation element 412 has a voltage-adjustable refractive index. Introduction of the analog reference signal adjusts the voltage across the modulation element 412 to change the effective thickness of modulation element 412 and thus the overall optical path length across the external cavity. Modulation of the optical path length produces intensity variations in the output power of the tunable external cavity laser 432 which can be detected by a detector. These intensity variations will decrease in magnitude and phase error as the tunable external cavity laser 432 is aligned with the center of the selected wavelength.

The analog reference signal introduced by modulation element 412 is detectable by a detector of the tunable external cavity laser 432. In one embodiment, the detector monitors the voltage across a gain medium of a tunable external cavity laser, or in another embodiment, monitors the current output of one or more photodiodes that sample the laser output. In the embodiment shown in FIG. 4, gain medium 402 provides an analog feedback signal to controller 110 that includes variations in the voltage of gain medium 402. Controller 110 generates a digital feedback signal based on the analog feedback signal received from gain medium 402. Controller 110 analyses the digital reference signal and the digital feedback signal to generate a tuning signal 120. The tuning signal 120 is sent to tuning elements 410. Tuning elements 410 make adjustments to one or more tuning functions to minimize the tuning error and keep the laser locked on the selected wavelength. Such tuning functions include, but are not limited to laser temperature control, laser motor control, and the like. In one embodiment, a tuning function re-positions end mirror 414 through temperature control. A thermoelectric controller (not shown) accordingly heats or cools a tuning arm (not shown) to re-position end mirror 414, and thus, adjust the optical path length to null out the wavelength tuning error.

Figure 5:
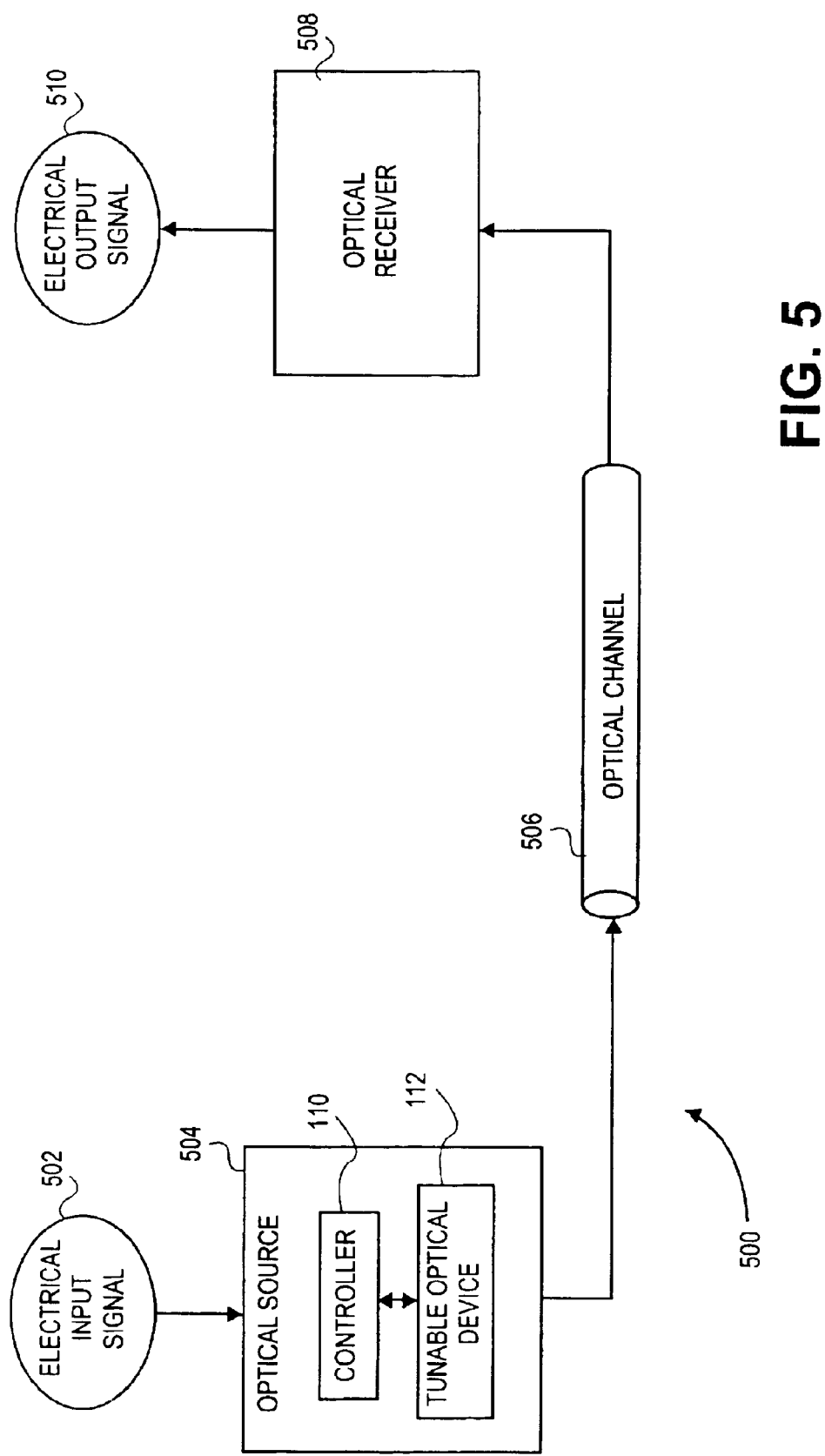
FIG. 5 is a block diagram of an optical communications system, in accordance with one embodiment of the present invention.

FIG. 5 is a system 500 according to one embodiment of the present invention. The system 500 includes an electrical input signal 502, an optical source 504, an optical channel 506, an optical receiver 508, and an electrical output signal 510. The optical source 504 receives electrical input signal 502. Electrical input signal 502 includes, but is not limited to, signals from such devices as computer networks, telephone networks, and the like. The optical source 504 includes a controller 110 and a tunable optical device 112. The controller 110 and the tunable optical device 112 work in conjunction with other components of the optical source 504 to convert the electrical input signal 502 into an optical signal. This optical signal is forwarded to optical receiver 508 via optical channel 506. Optical channel 506 includes, but is not limited to, one or more optical fibers, an optical cable, or the like. After receiving the optical signal, the optical receiver 508 converts the optical signal into an electrical signal and provides electrical output signal 510. Electrical output signal 510 includes, but is not limited to, signals receivable by such devices as computer networks, telephone networks, and the like.

The above description of illustrated embodiments of the invention, including what is described in the Abstract, is not intended to be exhaustive or to be limitation to the precise forms disclosed. While specific embodiments of, and examples for, the invention are described herein for illustrative purposes, various equivalent modifications are possible, as those skilled in the relevant art will recognize.

These modifications can be made to embodiments of the invention in light of the above detailed description. The terms used in the following claims should not be construed to limit the invention to the specific embodiments disclosed in the specification and the claims. Rather, the scope is to be determined entirely by the following claims, which are to be construed in accordance with established doctrines of claim interpretation.

What is claimed is:

1. An apparatus, comprising:
 a control unit to produce a digital reference signal;
 a digital-to-analog converter, coupled to the control unit, to convert the digital reference signal to an analog reference signal;
 a tunable optical device having an optical path, the tunable optical device coupled to the digital-to-analog converter to modulate an optical length of the optical path in response to the analog reference signal;
 a detector, coupled to the tunable optical device, to output an analog feedback signal corresponding to the analog reference signal;
 an amplifier coupled to the detector to amplify the analog feedback signal;
 a first filter coupled to the amplifier to filter the analog feedback signal; and
 an analog-to-digital converter, coupled to the filter, to convert the analog feedback signal to a digital feedback signal, the digital feedback signal received by the control unit, wherein the control unit is further to produce a tuning signal for wavelength locking of the tunable optical device.

2. The apparatus of claim 1 wherein the tunable optical device comprises a tunable laser including an external cavity, the optical length of the optical path corresponding to an optical length of the external cavity.

3. The apparatus of claim 1 wherein the control unit synchronizes the digital reference signal with sampling of the digital feedback signal.

4. The apparatus of claim 2 wherein the tuning signal is to be produced by the control unit based on the digital reference signal and the digital feedback signal.

5. The apparatus of claim 4 wherein the control unit to multiply the digital reference signal with the digital feedback signal to produce the tuning signal.

6. The apparatus of claim 1 further comprising a second filter coupled to the digital-to-analog converter and the tunable optical device.

7. The apparatus of claim 1 wherein the tunable optical device includes a tunable laser.

8. The apparatus of claim 1 wherein the control unit synchronizes the digital reference signal with sampling of the digital feedback signal.

9. The apparatus of claim 1 wherein the control unit includes a memory unit and a processor.

10. The apparatus of claim 9 wherein the memory unit includes nonvolatile memory.

11. The apparatus of claim 9 wherein the memory unit to store a waveform look-up table for the digital reference signal.

12. The apparatus of claim 9 wherein the processor to execute instructions stored in the memory unit to multiply the digital reference signal with the digital feedback signal.

13. The apparatus of claim 12 wherein the processor to execute instructions stored in the memory unit to digitally low pass filter the product of the digital reference signal and the digital feedback signal.

14. The apparatus of claim 9 wherein the processor to request digital reference signal data from a waveform look-up table stored in the memory unit in response to an interrupt signal.

15. The apparatus of claim 9 wherein the processor to send the digital reference signal to a digital-to-analog converter in response to an interrupt signal.

16. The apparatus of claim 9 wherein the processor to request the digital feedback signal from an analog-to-digital converter in response to an interrupt signal.

17. A method, comprising:
 generating a digital reference signal;
 sending an analog reference signal in response to the digital reference signal to a tunable optical device generating an output optical signal having a wavelength;
 dithering the wavelength of the output optical signal in response to the analog reference signal;
 recovering an analog feedback signal, corresponding to the analog reference signal, from the tunable optical device;
 filtering the analog feedback signal;
 generating a digital feedback signal in response to the analog feedback signal; and
 generating a tuning signal for wavelength locking of the tunable optical device in response to the digital reference signal and the digital feedback signal.

18. The method of claim 17 wherein generating a tuning signal includes multiplying the digital reference signal with the digital feedback signal.

19. The method of claim 18 further comprising digitally low pass filtering the product of the digital reference signal and the digital feedback signal.

20. The method of claim 17 wherein sending an analog reference signal in response to the digital reference signal to a tunable optical device includes sending the digital reference signal to a digital-to-analog converter.

21. The method of claim 17 wherein generating a digital feedback signal in response to the analog feedback signal includes providing the analog feedback signal to an analog-to-digital converter.

22. The method of claim 17 wherein generating a digital reference signal includes retrieving digital reference signal data from a waveform look-up table stored in a memory unit of a control unit.

23. An optical communication system, comprising:
an optical source to generate an optical signal, the optical source including:
 a control unit to produce a digital reference signal;
 a digital-to-analog converter, coupled to the control unit, to convert the digital reference signal to an analog reference signal;
 a tunable optical device coupled to the digital-to-analog converter, the tunable optical device responsive to the analog reference signal;
 a first filter coupled to the digital-to-analog converter and the tunable optical device;
 a detector, coupled to the tunable optical device, to output an analog feedback signal corresponding to the analog reference signal; and
 an analog-to-digital converter, coupled to the detector, to convert the analog feedback signal to a digital feedback signal, the digital feedback signal received by the control unit, wherein the control unit to produce a tuning signal for wavelength locking of the tunable optical device in response to the digital reference signal and the digital feedback signal;
 a second filter coupled to the detector and the analog-to-digital converter; and
an optical channel coupled to the optical source to transmit the optical signal.

24. The optical communication system of claim 23 wherein the control unit includes a processor and a memory unit.

25. The optical communication system of claim 24 wherein the processor to execute instructions stored in the memory unit to multiply the digital reference signal with the digital feedback signal.

26. The apparatus of claim 5 wherein the tuning signal introduces a modulation into an output of the tunable optical device.

* * * * *